(12) United States Patent
Xu et al.

(10) Patent No.: US 12,349,702 B2
(45) Date of Patent: Jul. 8, 2025

(54) MICROCAPSULE COMPRISING CHOLINE CHLORIDE AND METHOD FOR PREPARING THE SAME

(71) Applicant: Hangzhou Kingtechina Feed Co., Ltd., Hangzhou (CN)

(72) Inventors: Erhua Xu, Hangzhou (CN); Zhefeng Li, Hangzhou (CN); Qianyun Zhang, Hangzhou (CN)

(73) Assignee: Hangzhou Kingtechina Feed Co., Ltd., Hangzhou (CN)

( * ) Notice: Subject to any disclaimer, the term of this patent is extended or adjusted under 35 U.S.C. 154(b) by 1094 days.

(21) Appl. No.: 17/216,645

(22) Filed: Mar. 29, 2021

(65) Prior Publication Data

US 2021/0212341 A1  Jul. 15, 2021

Related U.S. Application Data

(63) Continuation-in-part of application No. PCT/CN2019/107649, filed on Sep. 25, 2019.

(30) Foreign Application Priority Data

Oct. 8, 2018 (CN) .......................... 201811168661.X

(51) Int. Cl.
| | | |
|---|---|---|
| *A23K 20/105* | (2016.01) | |
| *A23K 20/158* | (2016.01) | |
| *A23K 20/163* | (2016.01) | |
| *A23K 20/20* | (2016.01) | |
| *A23K 20/28* | (2016.01) | |
| *A23K 40/10* | (2016.01) | |
| *A23K 40/35* | (2016.01) | |
| *A23K 50/10* | (2016.01) | |

(52) U.S. Cl.
CPC .......... *A23K 20/105* (2016.05); *A23K 20/158* (2016.05); *A23K 20/163* (2016.05); *A23K 20/28* (2016.05); *A23K 20/30* (2016.05); *A23K 40/10* (2016.05); *A23K 40/35* (2016.05); *A23K 50/10* (2016.05)

(58) Field of Classification Search
CPC ...... A23K 20/158; A23K 20/30; A23K 20/28; A23K 20/105; A23K 20/163; A23K 50/10; A23K 40/10; A23K 10/30; A23K 40/35

See application file for complete search history.

(56) References Cited

FOREIGN PATENT DOCUMENTS

| CA | 2648934 A1 * | 10/2007 | ............. A23K 10/12 |
| WO | WO-2018154532 A1 * | 8/2018 | ........... A23K 20/105 |

\* cited by examiner

*Primary Examiner* — Vera Stulii

(57) ABSTRACT

The disclosure provides a microcapsule including: a core material, an inner membrane, and an outer membrane. The core material includes choline chloride and a carrier. The inner membrane includes at least one vegetable fat having a melting point higher than or equal to 60° C. The outer membrane includes rice bran wax, zinc oxide powders, and a film forming material. The film forming material is glucose phthalate, polyethylene glycol, or sodium alginate. The rice bran wax accounts for 5-10 wt. % of the microcapsule. The mass ratio of the rice bran wax to the zinc oxide powders to the film forming material is 1-5:0.1-1:0.1-1.

9 Claims, No Drawings

MICROCAPSULE COMPRISING CHOLINE CHLORIDE AND METHOD FOR PREPARING THE SAME

CROSS-REFERENCE TO RELATED APPLICATIONS

This application is a continuation-in-part of International Patent Application No. PCT/CN2019/107649 with an international filing date of Sep. 25, 2019, designating the United States, now pending, and further claims foreign priority benefits to Chinese Patent Application No. 201811168661.X filed Oct. 8, 2018. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a microcapsule comprising choline chloride and method for preparing the same.

Conventionally, choline is used as a feed additive for pigs, poultry and ruminants. In feed industry, choline is often provided by choline chloride. Compared with choline, choline chloride is more stable, and its aqueous solution is neutral and has less stimulation to animals. However, choline chloride crystal is hygroscopic and thus tend to agglomerate, which brings inconvenience to process, transportation and storage of the choline chloride-based feeds. In addition, the degradation rate of choline chloride in rumen is as high as 98.6%, so it is difficult for unprotected choline chloride to pass through the rumen of animals.

SUMMARY

The disclosure provides a microcapsule comprising: a core material, an inner membrane, and an outer membrane; the core material comprises choline chloride and a carrier. The inner membrane comprises at least one vegetable fat having a melting point more than 60° C.; the outer membrane comprises rice bran wax, zinc oxide powders and a film forming material, and the film forming material is glucose phthalate, polyethylene glycol, or sodium alginate; the rice bran wax accounts for 5-10 wt. % of the microcapsule; and a mass ratio of the rice bran wax to the zinc oxide powders to the film forming material is 1-5:0.1-1:0.1-1.

One key point of the microcapsule lies in the components of the inner membrane and the outer membrane, and the purity of choline chloride used is not strictly required; optionally, if the purity of choline chloride used is more than 99.5%, it is more conducive to improving the utilization efficiency of choline chloride for ruminants. The carrier can be a conventional one, such as silica, corn starch, dextrin. The vegetable fat with a melting point higher than 60° C. refers to the vegetable fat with a melting point higher than or equal to 60° C.

Rice bran wax is plastic, which is conducive to the formation of microcapsules; rice bran wax has a relatively high melting point, which can resist the degradation by the microorganisms in the rumen and the destruction of mechanical pressure and temperature in granulation process, and can delay the release or discharge of active substances. The film forming material is glucose phthalate, polyethylene glycol, or sodium alginate, which can prevent choline chloride from absorbing moisture and improve the passing rate of active ingredients through the rumen.

In the disclosure, a tight film tends to form between zinc oxide powders and rice bran wax, and zinc oxide powders are embedded in the film; zinc oxide powders are stable in the rumen in alkaline environment, which is helpful to reduce the mechanical damage caused to rice bran wax, resist the degradation by the microorganisms in the rumen, thus improving the stability of the outer membrane in the rumen; in the small intestine, zinc oxide powders react with acid small intestine liquid quickly, which causes the surface of rice bran wax to form a plurality of pores, and thus facilitating the release of choline chloride. Therefore, the combination of zinc oxide powders and rice bran wax can not only keep the effective components of the microcapsules from moisture absorption during storage and application, but also stay stable in the rumen, so that when arriving at the small intestine, the microcapsules are released immediately.

When zinc oxide is absent in the outer membrane, the passing rate of the microcapsules through the rumen and the release rate of choline chloride in the intestinal fluid are both adversely affected.

In a class of this embodiment, the zinc oxide powders are 200-600 mesh in diameter. Zinc oxide powders have relatively small particle size and large specific surface area, which can improve the contact surface area between the zinc oxide powders and small intestinal juice, and accelerate the reaction between the zinc oxide powders and small intestinal juice. The particle size is expected to be appropriate, if the zinc oxide powders are too fine, such as nano zinc oxide, it is easy to cause nano zinc oxide to disperse in the rumen and small intestine, which is not conducive to the growth of cattle; if the zinc oxide powders are coarse, it is not conducive to the growth of cattle, and the film formed by the zinc oxide powders and rice bran wax tends to be destroyed in the rumen, which affects the passing rate of the microcapsules through the rumen. Particularly, the zinc oxide powders are 300-500 mesh in diameter.

In a class of this embodiment, choline chloride accounts for 20-75 wt. % of the microcapsule. Because the microcapsule adopts specific inner and outer coating materials, the effective content of choline chloride in the microcapsule is significantly improved; even if the effective content of choline chloride is as high as 75%, no rupture of microcapsules happens, thus improving the utilization efficiency of choline chloride for ruminants. Particularly, choline chloride accounts for 30-75 wt. % of the microcapsule, and more particularly, choline chloride accounts for 50-75 wt. % of the microcapsule.

In a class of this embodiment, the carrier is silicon dioxide; and a mass ratio of choline chloride to the carrier is 1-2:0.2-1. Silicon dioxide is fluidable and adsorptive, and can fully absorb active substances.

The material of the inner membrane is vegetable fat with a melting point higher than the fermentation temperature in the rumen, and stays solid at room temperature and does not melt in the rumen. In a class of this embodiment, the inner membrane comprises brazil palm wax, Western beeswax, rice bran wax, or a mixture thereof.

To ensure that the inner membrane has a certain hardness, carnauba wax is preferred. The melting point of carnauba wax is 80-86° C., and the hardness of carnauba wax is very high, which can maintain the hardness of the coating particles and prevent the rupture of microcapsules; moreover, carnauba wax is non-toxic and harmless, and has the advantages of moisture-proof, anti-oxidation, good emulsifying performance and good molding performance.

In a class of this embodiment, the inner membrane accounts for 5-30 wt. % of the microcapsule, particularly, 15-30 wt. %.

In a class of this embodiment, choline chloride accounts for 20-75 wt. % of the microcapsule; a mass ratio of choline chloride to the carrier is 1-2:0.2-1; the inner membrane accounts for 5-30 wt. % of the microcapsule, and the balance is the outer membrane.

In a class of this embodiment, the zinc oxide powders account for 1-10 wt. % of the microcapsule; the film forming material is glucose phthalate and accounts for 1-10 wt. % of the microcapsule.

Glucose phthalate is a sugar derivative of phthalic acid, which is insoluble in water and alkaline solution, and soluble in most olefine acids. It helps the formation of the outer membrane and helps to stabilize the active substances in the alkaline conditions in the rumen and release completely after reaching the small intestine.

In a class of this embodiment, the microcapsule comprises, by weight:
 20-75% of choline chloride;
 10-20% of the carrier;
 5-30% of the inner membrane;
 5-10% of rice bran wax;
 5-10% of the film forming material; and 1-10% of the zinc oxide powders.

In a class of this embodiment, the microcapsule comprises, by weight:
 20-75% of choline chloride;
 10-20% of silicon dioxide;
 5-30% of brazil palm wax;
 5-10% of rice bran wax;
 1-10% of glucose phthalate; and 1-10% of the zinc oxide powders.

In a class of this embodiment, the microcapsule comprises, by weight:
 75% of choline chloride;
 10% of silicon dioxide;
 5% of brazil palm wax;
 5% of rice bran wax;
 2.5% of glucose phthalate; and
 2.5% of the zinc oxide powders.;
or,
 50% of choline chloride;
 25% of silicon dioxide;
 15% of brazil palm wax;
 5% of rice bran wax;
 2.5% of glucose phthalate; and
 2.5% of the zinc oxide powders
or,
 25% of choline chloride;
 25% of silicon dioxide;
 30% of brazil palm wax;
 10% of rice bran wax;
 5% of glucose phthalate; and
 5% of the zinc oxide powders.

The disclosure also provides a method for preparing the microcapsule, the method comprising:
1) mixing choline chloride and the carrier to yield a first mixture, and mixing a liquid vegetable fat with the first mixture to yield a second mixture, evenly stirring, and pelletizing the second mixture through freeze drying and spray drying, to form primary encapsulated granules; and
2) dissolving the rice bran wax and the film forming material in an organic solvent, adding the zinc oxide powders to the organic solvent containing dissolved rice bran wax and the film forming material to yield a third mixture, bottom spraying the primary encapsulated granules with the third mixture, to yield the microcapsule.

The organic solvent is anhydrous ethanol, isopropanol and other organic solvents that can dissolve fat. The organic solvent in the production process is recycled to avoid volatilization to the environment, and will not affect the growth and production of animals, for example, cattle. Specifically, the organic solvent is ethanol with a volume fraction of 75-85%. The rice bran wax, the film forming material, and the zinc oxide powders are dissolved in the organic solvent to yield the third mixture, and the third mixture is sprayed to the primary encapsulated granules. In a class of this embodiment, in 2), bottom spraying the primary encapsulated granules is implemented at a flow rate of 0.1-1 L/min and an inlet air temperature of 50-90° C. for 3-4 hours.

DETAILED DESCRIPTION

To further illustrate, embodiments detailing a microcapsule comprising choline chloride are described below. It should be noted that the following embodiments are intended to describe and not to limit the disclosure.

The zinc oxide powders used in the disclosure are 400 meshes in diameter, and the raw materials are commercially available.

Example 1

Provided is a microcapsule comprising, by weight, 25% of choline chloride, 25% of silicon dioxide, 30% of brazil palm wax, 10% of rice bran wax, 5% of glucose phthalate, and 5% of zinc oxide powders.

The microcapsule was prepared as follows:
1) 250 kg of choline chloride was pulverized and mixed with 250 kg of silicon dioxide, to yield a mixture;
2) 300 kg of brazil palm wax was melted in a reactor and rested at a temperature 20° C. higher than the melting point thereof; the melted brazil palm wax was mixed with the mixture obtained in 1) and evenly stirred, sprayed into a −8° C. freezing chamber for freezing drying, to yield primary encapsulated granules;
3) 100 kg of rice bran wax and 50 kg of glucose phthalate were dissolved in 500 L of 75% (v/v) ethanol solution, and then 50 kg of zinc oxide powders were added, to yield a mixed solution. The primary encapsulated granules were placed in a circulating fluidized bed, and the mixed solution was sprayed. The resulting product was filtered with a 20-mesh sieve, to yield the microcapsule comprising 25 wt. % of choline chloride.

The passing rate through the rumen of choline chloride of the microcapsule of the disclosure and the release rate in the intestinal juice were determined by a nylon bag method, and the anti-moisture effect thereof was investigated by observation method.

Test Methods:

The microcapsules were degraded in the rumen for 2 h, 4 h, 6 h, 12 h, 24 h, and 48 h, respectively. A microcapsule without being degraded was used as a control group (0 h). There were two parallel sample bags for each time point. Each bag was 5 g. The choline chloride residue of each bag was measured at each time point. The release rate of choline chloride was determined by freeze-dried powders of bovine intestinal juice (FDI). Appropriate amount of FDI was put into a plurality of enzymatic hydrolysis tubes each containing 30 mL of a buffer solution; 5 g of a microcapsule sample was added to a small nylon bag and put into each of the enzymatic hydrolysis tubes; the enzymatic hydrolysis tubes were placed on a water bath shaker at a constant temperature of 39° C. and vibrated; the samples were taken out and measured at 0 h, 2 h, 4 h, 6 h, 12 h, 24 h and 48 h, respectively. The contents of choline chloride in each sample at different time points were determined according to the chemical industry standard of the People's Republic of China (HB2941-1999). The microcapsule samples were placed at room temperature for 12 and 24 hours respectively, and the anti-moisture properties of the samples were observed.

Test Results:

TABLE 1

Passing rate of choline chloride of the microcapsule through rumen

| Degradation time | Weight before digestion (g) | Weight after digestion (g) | Loss of dry weight (%) | Passing rate (%) |
| --- | --- | --- | --- | --- |
| 0 h | 5.00 | 5.00 | 0.00 | 100.00 |
| 2 h | 5.00 | 4.98 | 0.40 | 99.50 |
| 4 h | 5.00 | 4.93 | 1.40 | 98.60 |
| 6 h | 5.00 | 4.93 | 1.40 | 98.55 |
| 12 h | 5.00 | 4.94 | 1.20 | 98.50 |
| 24 h | 5.00 | 4.95 | 1.00 | 98.44 |
| 48 h | 5.00 | 4.28 | 14.40 | 85.50 |

As shown in Table 1, after being degraded in the rumen, with the time passing by, the degradation rate gradually increased, and the loss of dry weight reached 14.40% at 48 h. The dry weight loss at other time points were 0.40%, 1.40%, 1.40%, 1.20% and 1.00%, respectively, which were significantly lower than that of the sample at 48 h, showing that the release of the microencapsulated choline chloride was effectively alleviated in rumen. However, the degradation rate increased significantly after 48 h, showing that the coated choline chloride was released gradually in different digestion stages for animals to absorb and utilize. The passage rate of choline chloride through rumen was more than 98% within 24 hours, and 85.50% after 48 hours. According to the physiological characteristics of dairy cows, the passage time of concentrated feed through rumen was generally less than 48 hours, which showed that the passage rate of choline chloride through the rumen of the disclosure fully satisfied the physiological requirements of dairy cows.

TABLE 2

Release rate of choline chloride of microcapsules in intestinal juice

| Degradation time | Weight before digestion (g) | Weight after digestion (g) | Loss of dry weight (%) | Release rate (%) |
| --- | --- | --- | --- | --- |
| 0 h | 5.00 | 5.00 | 0.00 | 0 |
| 2 h | 5.00 | 2.74 | 45.20 | 45.82 |
| 4 h | 5.00 | 0.93 | 81.40 | 83.10 |
| 6 h | 5.00 | 0.31 | 93.80 | 94.23 |
| 12 h | 5.00 | 0.25 | 95.00 | 95.52 |
| 24 h | 5.00 | 0.11 | 97.80 | 96.81 |
| 48 h | 5.00 | 0.10 | 98.00 | 98.12 |

As shown in Table 2, in the small intestinal, with the time passing by, the dry weight loss increased quickly, and the dry weight loss reached more than 80% at 4 h. 6 h later, choline chloride was almost completely degraded in the intestinal juice. Based on the release rate of choline chloride, the digestion rate of choline chloride was consistent with the dry weight loss of microcapsules. With the time passing by, microencapsulated choline chloride was rapidly decomposed and dissolved for animals' absorption. The results showed that after passing through rumen, the release of choline chloride in the intestine and the nutrition thereof for dairy cows were not affected. The release rate was 83.10% after 4 h treatment and 94.23% after 6 h treatment. The results showed that 90% of the microencapsulated choline chloride was released in the intestinal tract after 4-6 h, which could meet the requirements of digestion and absorption of choline chloride for dairy cows.

The microcapsule comprising choline chloride was stored in an uncovered vessel for 24 hours, and no adhesion was observed and the fluidity thereof was unaffected.

Example 2

Provided is a microcapsule comprising, by weight, 50% of choline chloride, 25% of silicon dioxide, 15% of brazil palm wax, 5% of rice bran wax, 2.5% of glucose phthalate, and 2.5% of zinc oxide powders.

The microcapsule was prepared as follows:
1) 500 kg of choline chloride was pulverized and mixed with 250 kg of silicon dioxide, to yield a mixture;
2) 150 kg of brazil palm wax was melted in a reactor and rested at a temperature 20° C. higher than the melting point thereof; the melted brazil palm wax was mixed with the mixture obtained in 1) and evenly stirred, sprayed into a −8° C. freezing chamber for freezing drying, to yield primary encapsulated granules;
3) 50 kg of rice bran wax and 25 kg of glucose phthalate were dissolved in 500 L of 75% (v/v) ethanol solution, and then 25 kg of zinc oxide powders were added, to yield a mixed solution. The primary encapsulated granules were placed in a circulating fluidized bed, and the mixed solution was sprayed. The resulting product was filtered with a 20-mesh sieve, to yield the microcapsule comprising 50 wt. % of choline chloride.

The test results showed that the passage rate of choline chloride through rumen was 96.43% within 24 hours, and the release rate of choline chloride was 94.33% after 6 h treatment. The microcapsule comprising choline chloride was stored in an uncovered vessel for 24 hours, and no adhesion was observed and the fluidity thereof was unaffected.

Example 3

Provided is a microcapsule comprising, by weight, 75% of choline chloride, 10% of silicon dioxide, 5% of brazil palm wax, 5% of rice bran wax, 2.5% of glucose phthalate, and 2.5% of zinc oxide powders.

The microcapsule was prepared as follows:
1) 750 kg of choline chloride was pulverized and mixed with 100 kg of silicon dioxide, to yield a mixture;
2) 50 kg of brazil palm wax was melted in a reactor and rested at a temperature 20° C. higher than the melting point thereof; the melted brazil palm wax was mixed with the mixture obtained in 1) and evenly stirred, sprayed into a −8° C. freezing chamber for freezing drying, to yield primary encapsulated granules;
3) 50 kg of rice bran wax and 25 kg of glucose phthalate were dissolved in 500 L of 75% (v/v) ethanol solution, and then 25 kg of zinc oxide powders were added, to yield a mixed solution. The primary encapsulated granules were placed in a circulating fluidized bed, and the mixed solution was sprayed. The resulting product was filtered with a 20-mesh sieve, to yield the microcapsule comprising 75 wt. % of choline chloride.

The test results showed that the passage rate of choline chloride through rumen is 95.90% within 24 hours, and the release rate of choline chloride is 94.95% after 6 h treatment. The microcapsule comprising choline chloride was stored in an uncovered vessel for 24 hours, and no adhesion was observed and the fluidity thereof was unaffected.

Comparison Example 1

Provided is a microcapsule which is basically the same as that in Example 1 except that the outer membrane of the microcapsule comprises 125 kg of rice bran wax, 75 kg of glucose phthalate, and excludes zinc oxide powders. The preparation method is also the same as that in Example 1.

The test results showed that the passage rate of choline chloride through rumen was 79.33% within 24 hours, and the release rate of choline chloride was 72.35% after 6 h treatment. The microcapsule comprising choline chloride was stored in an uncovered vessel for 24 hours, and no adhesion was observed and the fluidity thereof was unaffected.

Comparison Example 2

Provided is a microcapsule which is basically the same as that in Example 1 except that the outer membrane of the microcapsule comprises 100 kg of zinc oxide powders, 100 kg of glucose phthalate, and excludes rice bran wax. The preparation method is also the same as that in Example 1.

The test results showed that the passage rate of choline chloride through rumen was 70.07% within 24 hours, and the release rate of choline chloride was 85.00% after 6 h treatment. The microcapsule comprising choline chloride was stored in an uncovered vessel for 24 hours, and no adhesion was observed and the fluidity thereof was unaffected.

Comparison Example 3

Provided is a microcapsule which is basically the same as that in Example 1 except that the outer membrane of the microcapsule comprises 100 kg of fatty powders instead of rice bran wax, 50 kg of zinc oxide powders, and 50 kg of glucose phthalate. The preparation method is also the same as that in Example 1.

The test results showed that the passage rate of choline chloride through rumen was 75.37% within 24 hours, and the release rate of choline chloride was 94.86% after 6 h treatment. The microcapsule comprising choline chloride was stored in an uncovered vessel for 24 hours, and no adhesion was observed and the fluidity thereof was unaffected.

Comparison Example 4

Provided is a microcapsule which is basically the same as that in Example 1 except that the outer membrane of the microcapsule comprises 100 kg of hydrogenated palm oil instead of rice bran wax, 50 kg of zinc oxide powders, and 50 kg of glucose phthalate. The preparation method is also the same as that in Example 1.

The test results showed that the passage rate of choline chloride through rumen was 82.65% within 24 hours, and the release rate of choline chloride was 94.75% after 6 h treatment. The microcapsule comprising choline chloride was stored in an uncovered vessel for 24 hours, and no adhesion was observed and the fluidity thereof was unaffected.

Example 4

Provided is a microcapsule which is basically the same as that in Example 1 except that the microcapsule comprises polyethylene glycol instead of glucose phthalate. The preparation method is also the same as that in Example 1.

The test results showed that the passage rate of choline chloride through rumen was 95.32% within 24 hours, and the release rate of choline chloride was 95.47% after 6 h treatment. After stored in an uncovered vessel for 24 hours, the microcapsule comprising choline chloride was wet and tended to adhere to each other, and the fluidity thereof was poor.

Example 5

Provided is a microcapsule which is basically the same as that in Example 1 except that the microcapsule comprises sodium alginate instead of glucose phthalate. The preparation method is also the same as that in Example 1.

The test results showed that the passage rate of choline chloride through rumen was 94.73% within 24 hours, and the release rate of choline chloride was 93.53% after 6 h treatment. After stored in an uncovered vessel for 24 hours, the microcapsule comprising choline chloride was wet and tended to adhere to each other, and the fluidity thereof was poor.

Comparison Example 5

Provided is a microcapsule comprising, by weight, 50% of choline chloride, 10% of silicon dioxide, 5% of brazil palm wax, 10% of rice bran wax, 5% of glucose phthalate, and 20% of zinc oxide powders.

The microcapsule was prepared as follows:
1) 500 kg of choline chloride was pulverized and mixed with 100 kg of silicon dioxide, to yield a mixture;
2) 50 kg of brazil palm wax was melted in a reactor and rested at a temperature 20° C. higher than the melting point thereof; the melted brazil palm wax was mixed with the mixture obtained in 1) and evenly stirred, sprayed into a −8° C. freezing chamber for freezing drying, to yield primary encapsulated granules;
3) 100 kg of rice bran wax and 50 kg of glucose phthalate were dissolved in 500 L of 75% (v/v) ethanol solution, and then 200 kg of zinc oxide powders were added, to yield a mixed solution. The primary encapsulated granules were placed in a circulating fluidized bed, and the mixed solution was sprayed. The resulting product was filtered with a 20-mesh sieve, to yield the microcapsule comprising 50 wt. % of choline chloride.

The test results showed that the passage rate of choline chloride through rumen was 85.17% within 24 hours, and the release rate of choline chloride was 96.65% after 6 h treatment. The microcapsule comprising choline chloride was stored in an uncovered vessel for 24 hours, and no adhesion was observed and the fluidity thereof was unaffected.

Example 6

Provided is a microcapsule which is basically the same as that in Example 1 except that the inner membrane of the microcapsule comprises Western beeswax instead of brazil palm wax. The preparation method is also the same as that in Example 1.

The test results showed that the passage rate of choline chloride through rumen was 90.11% within 24 hours, and the release rate of choline chloride was 94.97% after 6 h treatment. The microcapsule comprising choline chloride was stored in an uncovered vessel for 24 hours, and no adhesion was observed and the fluidity thereof was unaffected.

Example 7

Provided is a microcapsule which is basically the same as that in Example 1 except that the inner membrane of the microcapsule comprises rice bran wax instead of brazil palm wax. The preparation method is also the same as that in Example 1.

The test results showed that the passage rate of choline chloride through rumen was 92.97% within 24 hours, and the release rate of choline chloride was 90.45% after 6 h treatment. The microcapsule comprising choline chloride was stored in an uncovered vessel for 24 hours, and no adhesion was observed and the fluidity thereof was unaffected.

Examples 8-10

Based on the preparation method in Example 1, the raw materials of the microcapsules and the percent thereof were listed as follows, and the test results were shown in Table 3.

TABLE 3

| Components | wt. % |
|---|---|
| Example 8 | |
| Choline chloride | 60 |
| Silicon dioxide | 10 |
| Brazil palm wax + Western beeswax | 5 + 5 |
| Rice bran wax | 10 |
| Glucose phthalate | 5 |
| Zinc oxide powders | 5 |
| Passing rate through rumen (24 h) | 95.83 |
| Release rate in the intestinal tract (6 h) | 94.50 |
| Hygroscopy | Nonhydroscopic |
| Example 9 | |
| Choline chloride | 30 |
| Silicon dioxide | 15 |
| Rice bran wax + Western beeswax | 15 + 15 |
| Rice bran wax | 10 |
| Glucose phthalate | 5 |
| Zinc oxide powders | 10 |
| Passing rate through rumen (24 h) | 91.33 |
| Release rate in the intestinal tract (6 h) | 92.35 |
| Hygroscopy | Nonhydroscopic |
| Example 10 | |
| Choline chloride | 20 |
| Silicon dioxide | 20 |
| Brazil palm wax + rice bran wax | 15 + 15 |
| Rice bran wax | 10 |
| Glucose phthalate | 10 |
| Zinc oxide powders | 10 |

TABLE 3-continued

| Components | wt. % |
|---|---|
| Passing rate through rumen (24 h) | 96.90 |
| Release rate in the intestinal tract (6 h) | 91.45 |
| Hygroscopy | Nonhydroscopic |

The following advantages are associated with the microcapsule comprising choline chloride of the disclosure:

1. The outer membrane of the microcapsule comprises rice bran wax, zinc oxide powders and film-forming material, so that the passing rate of the microcapsule comprising choline chloride through rumen and the release rate in small intestine are improved, the hygroscopy of the microcapsule during storage and use is reduced, thereby improving the utilization efficiency of choline chloride for ruminants.

2. In addition to the outer membrane, the microcapsule comprises an inner membrane coating choline chloride, which further improves the passing rate of choline chloride through rumen, and reduces the hygroscopy of choline chloride.

It will be obvious to those skilled in the art that changes and modifications may be made, and therefore, the aim in the appended claims is to cover all such changes and modifications.

What is claimed is:

1. A microcapsule, comprising:
   a core material, the core material comprising choline chloride and a carrier;
   an inner membrane, the inner membrane comprising at least one vegetable fat having a melting point higher than or equal to 60° C.; and
   an outer membrane, the outer membrane comprising rice bran wax, zinc oxide powders, and a film forming material;
   wherein the film forming material is glucose phthalate;
   the rice bran wax accounts for 5-10 wt. % of the microcapsule; and
   a mass ratio of the rice bran wax to the zinc oxide powders to the film forming material is 1-5:0.1-1:0.1-1;
   wherein the inner membrane is brazil palm wax;
   the zinc oxide powders are 300-500 mesh in diameter.

2. The microcapsule of claim 1, wherein the choline chloride accounts for 20-75 wt. % of the microcapsule.

3. The microcapsule of claim 2, wherein the carrier is silicon dioxide; and a mass ratio of the choline chloride to the carrier is 1-2:0.2-1.

4. The microcapsule of claim 1, wherein the inner membrane accounts for 5-30 wt. % of the microcapsule.

5. The microcapsule of claim 1, wherein the choline chloride accounts for 20-75 wt. % of the microcapsule; a mass ratio of the choline chloride to the carrier is 1-2:0.2-1; the inner membrane accounts for 5-30 wt. % of the microcapsule, and the balance is the outer membrane.

6. The microcapsule of claim 1, wherein the zinc oxide powders account for 1-10 wt. % of the microcapsule; the film forming material accounts for 1-10 wt. % of the microcapsule.

7. The microcapsule of claim 1, comprising, by weight:
   20-75% of the choline chloride;
   10-20% of the carrier;
   5-30% of the inner membrane;

5-10% of the rice bran wax;
5-10% of the film forming material; and
1-10% of the zinc oxide powders.

8. The microcapsule of claim 1, comprising, by weight:
20-75% of the choline chloride;
10-20% of silicon dioxide;
5-30% of the brazil palm wax;
5-10% of the rice bran wax;
1-10% of the glucose phthalate; and
1-10% of the zinc oxide powders.

9. The microcapsule of claim 1, comprising, by weight:
75% of the choline chloride;
10% of silicon dioxide;
5% of the brazil palm wax;
5% of the rice bran wax;
2.5% of glucose phthalate; and
2.5% of the zinc oxide powders.

\* \* \* \* \*